(12) United States Patent
Haag

(10) Patent No.: US 8,386,591 B2
(45) Date of Patent: Feb. 26, 2013

(54) METHOD AND BROADBAND ACCESS SYSTEM FOR REMOTE-CONTROLLING A VOICE INTERFACE OF AN ACCESS NODE

(75) Inventor: Thomas Haag, Rodgau (DE)

(73) Assignee: Deutsche Telekom AG, Bonn (DE)

( * ) Notice: Subject to any disclaimer, the term of this patent is extended or adjusted under 35 U.S.C. 154(b) by 798 days.

(21) Appl. No.: 12/527,520

(22) PCT Filed: Jan. 22, 2008

(86) PCT No.: PCT/DE2008/000102
§ 371 (c)(1),
(2), (4) Date: Aug. 17, 2009

(87) PCT Pub. No.: WO2008/101454
PCT Pub. Date: Aug. 28, 2008

(65) Prior Publication Data
US 2010/0074250 A1    Mar. 25, 2010

(30) Foreign Application Priority Data
Feb. 19, 2007  (DE) .......................... 10 2007 008 463

(51) Int. Cl.
*G06F 15/177*  (2006.01)
*H04L 12/66*  (2006.01)
(52) U.S. Cl. ....................................... 709/222; 370/352
(58) Field of Classification Search .................. 370/352, 370/236.1–236.2; 709/221–222
See application file for complete search history.

(56) References Cited

U.S. PATENT DOCUMENTS

| | | | |
|---|---|---|---|
| 7,130,273 B2* | 10/2006 | Baj | 370/242 |
| 2004/0066923 A1 | 4/2004 | Robinson | |
| 2004/0068571 A1* | 4/2004 | Ahmavaara | 709/228 |
| 2004/0107299 A1 | 6/2004 | Lee et al. | |
| 2004/0125923 A1* | 7/2004 | See et al. | 379/88.17 |
| 2005/0101245 A1 | 5/2005 | Ahmavaara | |
| 2006/0221940 A1* | 10/2006 | Ong et al. | 370/352 |
| 2006/0285535 A1* | 12/2006 | Metcalf et al. | 370/352 |

FOREIGN PATENT DOCUMENTS

| | | |
|---|---|---|
| EP | 1536608 | 6/2005 |
| WO | WO-2005074462 | 8/2005 |

OTHER PUBLICATIONS

International Search Resort for PCT/DE2008/000102, mailed on Oct. 10, 2008.

* cited by examiner

*Primary Examiner* — Chirag R Patel
(74) *Attorney, Agent, or Firm* — Leydig, Voit & Mayer Ltd.

(57) ABSTRACT

A method for controlling an access node interface connected to a VoIP server via an IP-based network, wherein subscriber lines connect a plurality of subscriber terminals to the access node, includes storing subscriber-specific data in a memory device associated with the VoIP server, where the data contains information to configure an access node voice interface. The access node determines whether at least one of the plurality of subscriber terminals is connected to the interface. If at least one of the subscribers is connected to the interface, then interface-associated identification data is transmitted from the access node to the VoIP server using an IP-based protocol. In response to the interface identification data received, subscriber-specific data filed for the connected interface is transmitted from the VoIP server to the access node using the IP-based protocol. The access node is configured, using the subscriber-specific data, so that the interface is operated as a voice interface.

17 Claims, 6 Drawing Sheets

| DSL-type | Data |
|---|---|

Fig. 6

| Port-type | Subscriber access data | Performance features |
|---|---|---|

Fig. 7

METHOD AND BROADBAND ACCESS SYSTEM FOR REMOTE-CONTROLLING A VOICE INTERFACE OF AN ACCESS NODE

CLAIM OF PRIORITY

This application is a U.S. national phase application under 35 U.S.C. §371 of International Patent Application No. PCT/DE2008/000102 filed Jan. 22, 2008, and claims the benefit of priority of German Patent Application No. DE 10 2007 008463.5, filed Feb. 19, 2007. The International Application was published in German on Aug. 28, 2008 as WO 2008/101454.

FIELD

The invention relates to control of an access node interface connected to a VoIP server via an IP-based communications network, and in particular to subscriber-specific control of an access node used in a broadband access network.

BACKGROUND

Broadband access networks serve inter alia to allow subscribers access to IP-based networks, for example to the Internet. Broadband access networks of this type generally comprise a plurality of access multiplexers, also referred to as access nodes (ANs). Subscriber terminals can be connected to the access nodes via subscriber lines. Examples of known access nodes include DSLAMs (digital subscriber line access multiplexers) to which terminals can be connected via digital subscriber lines (DSLs). Analogue and digital telephones are in this case connected by means of a subscriber-side network termination and computers by means of a DSL modem to the digital subscriber line via a splitter. A splitter, which supplies voice signals to a conventional telephone network and broadband data to the Internet, is, in turn, arranged in the DSLAM. However, access networks of this type do not allow voice signals to be transmitted via the Internet.

In addition, there are solution approaches based on the H.248 Gateway Control Protocol standardised by the ITU. This protocol controls the transmission of voice and signalling data via a media gateway which converts voice signals into VoIP signals. However, the existing solutions do not allow the use of conventional analogue or digital telephones, such as for example ISDN telephones, in order to be able to transmit and receive VoIP signals at the access node via the Internet.

SUMMARY

An embodiment of the present invention provides a method for controlling an interface of an access node connected to a VoIP server via an IP-based communications network, wherein a plurality of subscriber terminals are connected to the access node via subscriber lines. The method includes storing subscriber-specific data in a memory device associated with the VoIP server, the data containing information operable to configure a voice interface of the access nodes. Whether at least one of the plurality of subscriber terminals is connected to the interface is determined by the access node. If at least one of the plurality of subscriber is connected, then identification data associated with the interface is transmitted from the access node to the VoIP server using an IP-based signaling protocol. In response to the interface identification data received, subscriber-specific data filed for the connected interface is transmitted from the VoIP server to the access node using the IP-based signaling protocol. The access node is configured, using the subscriber-specific data, so that the interface is operated as a voice interface.

In another embodiment, the present invention provides a broadband access system for controlling an interface of an access node. The broadband access system includes at least one remote-controllable access node connected to a VoIP server via an IP-based communications network, at least one analogue or digital subscriber terminal connected to the access node via a subscriber line, a system memory device associated with the VoIP server configured to store subscriber-specific data operable to configure the at least one voice interface of the access node. The access node includes at least one voice interface, an access node memory device configured to store an item of identification information regarding the voice interface, a device for identifying whether a subscriber terminal is connected at the voice interface, a device for exchanging signaling information with the VoIP server using an IP-based signaling protocol, a remote control device operable to configure the voice interface in response to the subscriber-specific data associated with the voice interface. The VoIP server is configured to read out and transmit subscriber-specific data to the access node in response to a received item of identification information from a voice interface of the access node.

In another embodiment, the present invention provides an access node for use in a broadband access system. The access node includes at least one voice interface, a memory device configured to store an item of identification information regarding the voice interface, an identification device configured to indentify whether a subscriber terminal is connected at the voice interface, a device for exchanging signaling information with a VoIP server using an IP-based signaling protocol, and a remote control device configured to remotely control the voice interface in response to subscriber-specific data associated with the voice interface.

BRIEF DESCRIPTION OF THE DRAWINGS

FIG. 6 is a schematic view of an ANCP data frame; and

FIG. 7 is a schematic view of an ANCP data frame in accordance with an embodiment of the present invention.

DESCRIPTION

Figure 1:
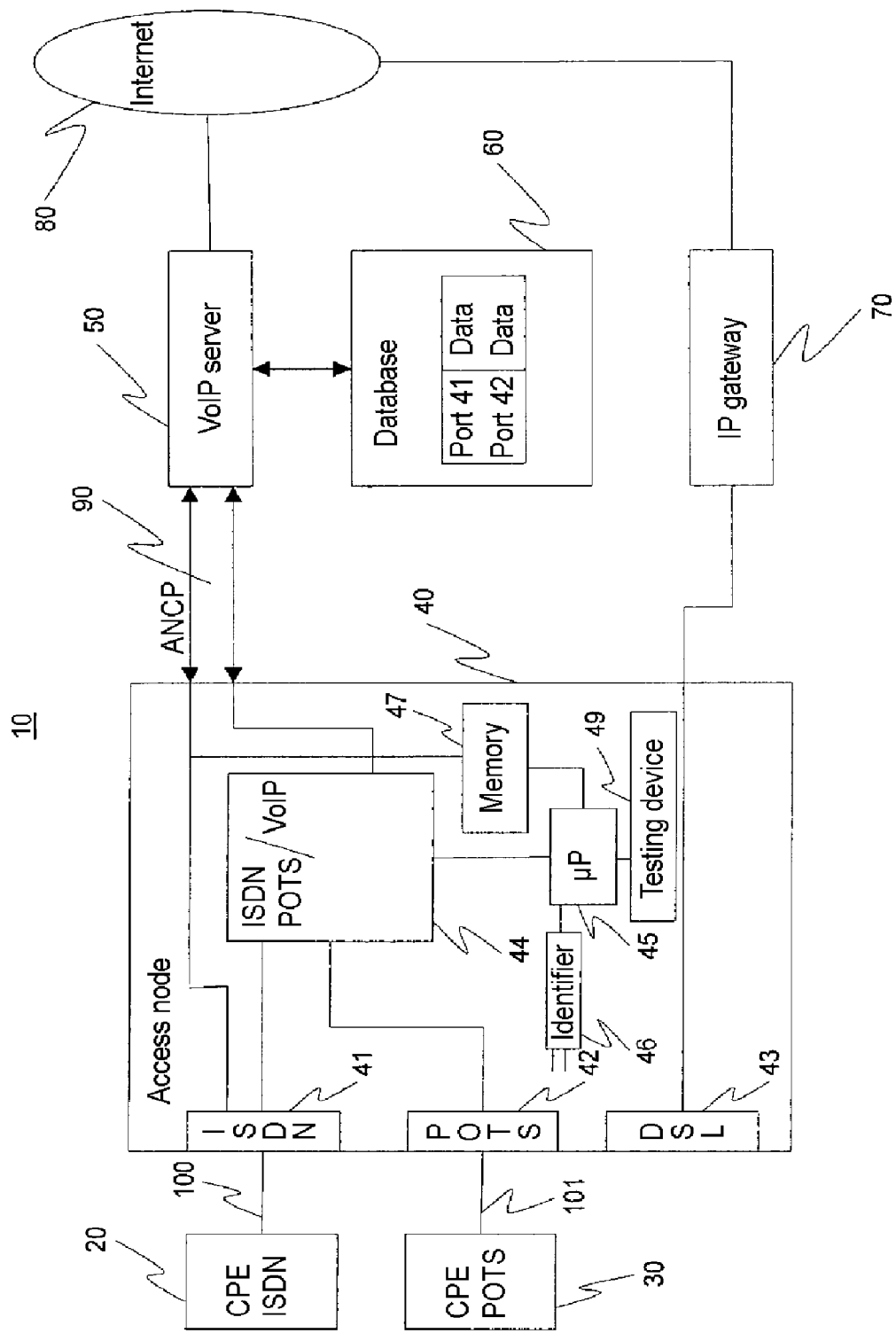
FIG. 1 is a block diagram of an exemplary broadband access network in which the invention is realized.
Figure 2:
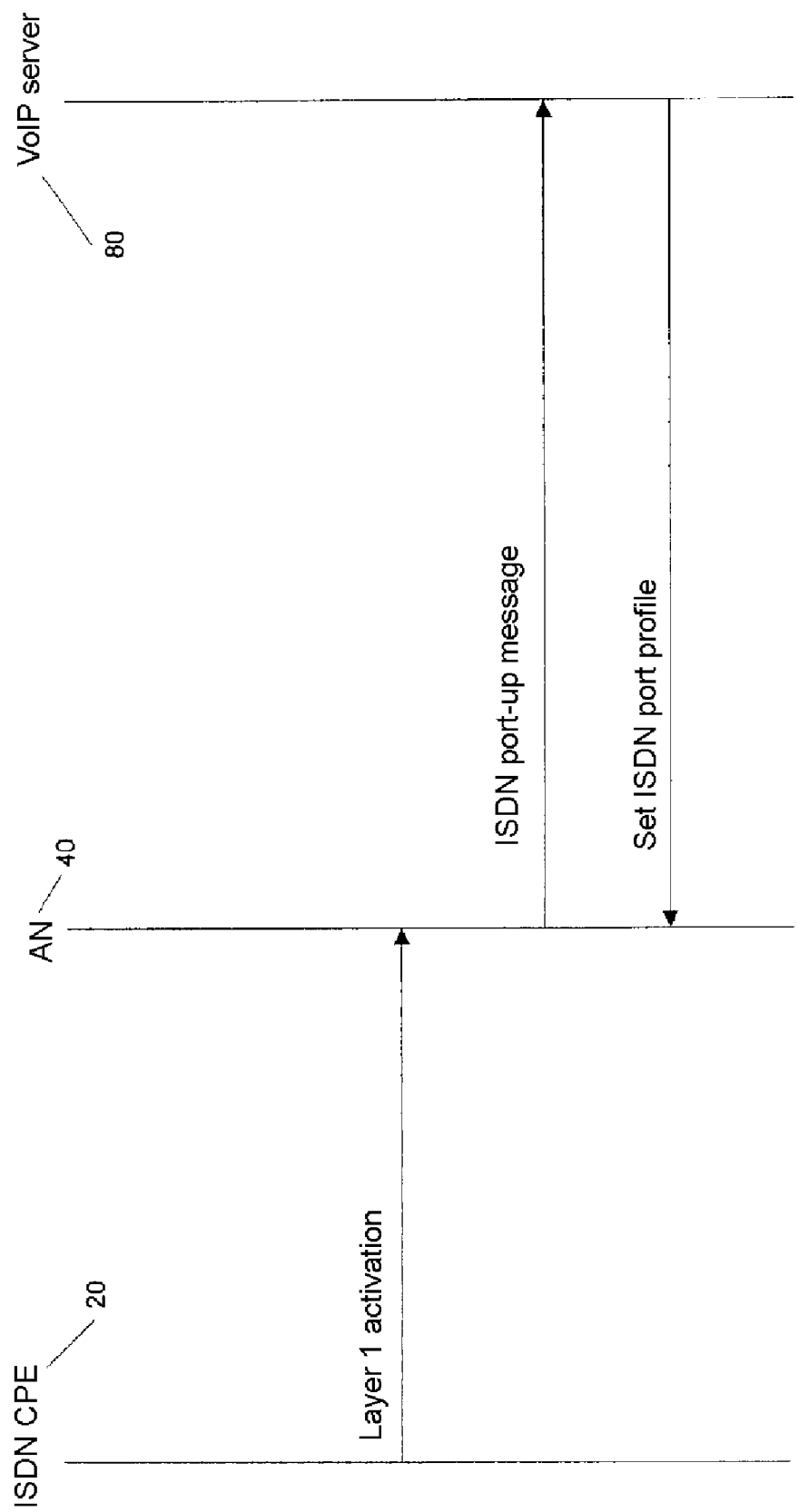
FIG. 2 shows a message flow for activating an ISDN voice interface.

Embodiments of the present invention are able to connect conventional analogue and digital telephone sets to a broadband access network in order to be able to transmit VoIP signals via an IP-based communications network, in particular the Internet, using an access node. Described are aspects of providing access nodes which can be adapted in a simple manner for connecting conventional analogue or digital telephone sets.

These access nodes can be provided with remote-controllable voice interfaces or voice ports which can exchange control data with a VoIP server via an IP-based signalling protocol.

In one embodiment, a method provides for subscriber-specifically controlling an interface of an access node which is connected to a VoIP server via an IP-based communications network. A plurality of subscriber terminals can be connected to the access node via subscriber lines. The subscriber terminals may be conventional analogue and digital telephones, such as for example ISDN telephones. Analogue terminals will be referred to hereinafter as POTS (plain old telephone service) apparatuses. Examples of the subscriber lines used include analogue lines, ISDN lines and also digital subscriber lines.

Subscriber-specific data are filed in a memory device associated with the VoIP server. The subscriber-specific data are used for remotely configuring at least one voice interface of the access node. During the initial set-up of the access node or else during operation, the access node determines whether a subscriber terminal is connected at an interface. If it is, identification data associated with the interface are transmitted from the access node to the VoIP server using an IP-based signalling protocol. In response to the interface identification data received, the VoIP server reads out the subscriber-specific data filed for this interface from the memory device and transmits them to the access node using the IP-based signalling protocol. The subscriber-specific data may be subscriber-relevant access data, such as for example a subscriber call number, an SIP identifier and at least one service feature of at least one analogue or digital subscriber connection. Using the subscriber-specific data received, the access node is configured in such a way that the interface determined, at which a subscriber terminal has been connected, is operated as a voice interface. Depending on whether the connected subscriber terminal is an analogue or digital telephone set, the voice interface of the access node is configured as an ISDN or POTS voice interface. In one embodiment, the remote-controlled configuration of the access node is triggered not by the network operator by way of a corresponding network configuration, but by identifying the connecting of a subscriber terminal to the access node.

The service features which are associated with the voice interface via the subscriber-specific data may be for example a three-party conference call, broker's call and the like.

If the connected subscriber terminal is an ISDN telephone, the subscriber-relevant access data contain for example the ISDN multiple call number. If, conversely, an analogue telephone set is connected to the access node, the subscriber-relevant access data contain the E.164 call number of the corresponding subscriber connection. The SIP (Session Initiation Protocol) identifier may be a Uniform Resource Identifier (URI) and/or a TCP port number.

A subscriber terminal can also contain a network termination device to which analogue and/or digital terminals can be connected.

The access node can convert the subscriber call number, associated with the voice interface, of the connected subscriber terminal into the corresponding SIP identifier and vice versa.

The voice interface, to which a subscriber terminal has been connected, is identified by an unambiguous interface addressing scheme. The number of a slot, into which a line card can be inserted, and the port number are in particular used for this purpose.

As a result of the interface identification data, the subscriber-specific data pertaining to the connected subscriber connection are known to the VoIP server, the automatic identification of the voice interface also allows an unambiguous identification of the subscriber connection—an analogue (POTS) or digital (ISDN) connection—which is connected to this voice interface.

In order to allow VoIP voice transmission between conventional analogue or digital telephone sets and the Internet, the voice and signalling signals coming from an analogue or digital subscriber terminal are converted in the access node into VoIP signals for transmission to the VoIP server. In the opposite direction, the VoIP signals coming from the VoIP server are converted in the access node into voice and signalling signals for transmission to an analogue or digital subscriber terminal.

In order to be able to exchange voice signals between the access node and the VoIP server, a VoIP connection is set up between the access node and the VoIP server under the control of the access node, via which connection voice signals are exchanged between the subscriber terminal, which is connected at the interface determined, and the VoIP server. The SIP (Session Initiation Protocol) may for example be used for this purpose in the access node.

The subscriber-specific, remote-controllable interface control of the access node also allows testing of the subscriber line on which a subscriber terminal is connected. For this purpose, a control command is transmitted, using the IP-based signalling protocol, from the VoIP server to the access node for activating the testing of a subscriber line between access node and the subscriber terminal connected at the interface. Subsequently, the subscriber line connected at the respective interface is tested. An item of information which indicates the state of the subscriber line is transmitted from the access node to the VoIP server using the IP-based signalling protocol.

The access node can test subscriber lines which are terminated by an ISDN-based connection or by a POTS-based connection. If a subscriber line is terminated by a POTS connection, a loop test is carried out in that a resistance, current or voltage measurement is taken at the wired voice interface of the access node. If the subscriber line is terminated by an ISDN-based connection, an appropriate test word is for example transmitted to the ISDN subscriber connection which sends back a reply. The reply can signal an error or a subscriber line operated in an error-free manner.

The IP-based signalling protocol may be a modified Access Node Control Protocol (ANCP). The ANCP is a control protocol which is being standardised and controls communication between a DSLAM and a broadband access server. According to the invention, the ANCP is modified in order to be able to exchange signalling data between the access node and the VoIP server, so that voice signals from conventional analogue or digital telephone sets can be transmitted or received via the Internet.

The broadband access system has at least one remote-controllable access node which is connected to a VoIP server via an IP-based communications network. Also provided is at least one analogue or digital subscriber terminal which can be connected to the access node via a subscriber line. Depending on the embodiment of the subscriber terminal, the subscriber line may be an analogue line, an ISDN line or a digital subscriber line (DSL). A memory device, in which subscriber-specific data are stored for configuring the at least one voice interface of the access node, is associated with the VoIP server. The subscriber-specific data are associated with a subscriber connection which is connected to a specific interface of the access node.

The access node has at least one voice interface, a memory device for storing an item of identification information regarding the voice interface and also an identification device which ascertains whether a subscriber terminal is connected at the voice interface. Furthermore, the access node has a device for exchanging signalling information with the VoIP server using an IP-based signalling protocol. In addition, a device is provided for configuring the voice interface in response to the subscriber-specific file associated with the voice interface. The VoIP server is embodied for reading out and transmitting subscriber-specific data to the access node in response to a received item of identification information from a voice interface of the access node.

In order to allow VoIP voice transmission for conventional analogue or digital telephone sets, the access node can be configured in such a way that the voice interface is able to transmit and receive voice signals to and from an analogue or digital subscriber connection.

In order not to have to carry out any restructuring of the communications network for the transmission of VoIP signals, the access node has a conversion device which can convert voice signals coming from an analogue or digital subscriber terminal into VoIP signals, and which can convert VoIP signals into voice signals for transmission to an analogue or digital subscriber terminal.

In order to be able to test in a simple manner and without operators a subscriber line which is terminated by the access node and a subscriber terminal, the access node has a testing device which carries out a test of the subscriber line in response to a control command from the VoIP server.

In order to be able to transmit and receive also broadband data from a subscriber terminal to and from the Internet via the access system, the access node has at least one broadband data interface to which, for example, a computer can be connected. Furthermore, the access node has an interface via which an IP-based connection can be established to an IP gateway.

Furthermore, the access node has a control device which is embodied for establishing an IP-based voice communication connection to the VoIP server. The control device uses for example the SIP (Session Initiation Protocol).

The access node comprises at least one voice interface, a memory device for storing an item of identification information regarding the voice interface, a device for identifying whether a subscriber terminal is connected at the voice interface, a device for exchanging signalling information with a VoIP server using an IP-based signalling protocol, and a device for remotely controlling the voice interface in response to subscriber-based data associated with the voice interface.

According to an embodiment, the access node has a conversion device which can convert voice signals coming from an analogue or digital subscriber terminal into VoIP signals, and which can convert VoIP signals into voice signals for transmission to an analogue or digital subscriber terminal In an advantageous manner, the access node has a remote-controllable testing device which, in response to a control command from a VoIP server, carries out a test of a subscriber line which is terminated by the access node and an analogue or digital subscriber terminal.

FIG. 1 shows an exemplary broadband access system 10 which has an access node 40, also referred to as an access multiplexer, which can be connected to a VoIP server via an IP-based communication connection of an IP-based network 90. As will be described in greater detail hereinafter, signalling and control data are exchanged between the access node 40 and the VoIP server 50 by means of a specific signalling protocol. The VoIP server 50 is for example connected to the Internet 80. The access node 40 is connected via a further IP connection via the IP-based network 90 to an IP gateway 70 which serves in a manner known per se to transmit broadband data from a terminal (not shown) to the Internet via the access node 40 or to receive such data via said access node. The access node 40 contains a plurality of slots (not shown) into which printed circuit boards can be inserted. The printed circuit boards have a plurality of ports which each terminate a subscriber line. In the present example, let it be assumed that three printed circuit boards are inserted in the access node 40. Each printed circuit board can have a plurality of interfaces, to each of which a subscriber line can be connected. For the sake of clarity, FIG. 1 shows just one port 41 of the first printed circuit board, which port can be configured, as will be described hereinafter in greater detail, as an ISDN voice interface. With regard to the second printed circuit board, just one port 42 is shown, which in the present exemplary embodiment can be configured as a POTS voice interface. The third printed circuit board is illustrated schematically by a port 43 which is implemented as a broadband data interface. As FIG. 1 also shows, an ISDN subscriber line 100 is connected at the port 41. On the subscriber side, the subscriber line 100 is terminated for example by an ISDN telephone 20. In the field of broadband access networks, the subscriber terminals are also designated as customer premise equipment (CPE). Connected to the port 42 of the second printed circuit board is, for example, an analogue subscriber line 101 which is connected on the subscriber side to an analogue conventional telephone 30. In the present example, the port 43 of the third printed circuit board is not wired. The access node 40 has furthermore a converter 44 which can convert the voice signals coming from the port 41 and 42 into VoIP signals and VoIP signals received in the opposite direction into ISDN voice signals for the port 41 and into analogue voice signals for the port 42. Alternatively, a converter device of this type can also be implemented on each printed circuit board. Also implemented in the access node is an identification device 46 which can identify whether port 41 or 42 has been connected to a subscriber terminal A testing device 49 serves to test the state of a subscriber line terminated on the subscriber side.

Should the subscriber line be a digital subscriber line (DSL), via which both narrowband voice signals and broadband data signals can be transmitted, the access node 40 has functionalities of a conventional DSLAM. These include for example a splitter which supplies the narrowband voice signals, irrespective of whether they are POTS or ISDN voice signals, to the voice port of the respective printed circuit board and broadband data signals to the corresponding data port. A programmable control unit 45 monitors and controls the operation of the access node 40. The control unit 45 serves for example to set up, using the Session Initiation Protocol, a VoIP connection between the node 40 and the VoIP server 50, such as is illustrated in FIG. 1. Furthermore, the access node 40 itself and/or each printed circuit board can have a memory device in which identification data from the respective port are filed. In the present example, a local memory 47 is provided. The identification data from a port contain the number of the slot in which the printed circuit board is inserted, and also the port number. The access node 40 and/or the printed circuit boards can each have a further memory device in which subscriber-specific data can be filed. As will be demonstrated hereinafter, these data are used for automatically configuring the ports 41 and 42 which are voice interfaces.

The subscriber-specific data are filed in a memory device 60 associated with the VoIP server 50. The memory device may be an external database 60, a memory network or a local memory device within the VoIP server 50. In an embodiment, the memory device is embodied as an external database 60 and connected to the VoIP server 50. Filed in the database 60 is a data table containing the identification data from the ports 41 and 42 and, in addition, subscriber-specific data which are associated with the respective port or the subscriber connection which can be connected to the respective ports. Stored in the database 60 are the subscriber-based data from the subscriber connection to which the ISDN telephone 20 is connected. The subscriber-specific data contain, for example, the ISDN multiple call number of the subscriber connection connected to the subscriber line. In addition, they can contain a corresponding SIP identification, under which the VoIP server can address the port 41 of the access node, and also the service features which can be configured and activated for the subscriber connection at the access node 40. The subscriber-specific data from the analogue subscriber terminal terminating the subscriber line 101 are also filed in the database 60 and associated with the identification data from the port 42. These subscriber-specific data contain particulars concerning the type of connection at which the analogue telephone 30 has been connected, an E.164 subscriber call number, an SIP identifier and also the performance features which are to be associated with the analogue subscriber connection.

The mode of operation of the exemplary broadband access system 10 illustrated in FIG. 1 will be described hereinafter in greater detail in conjunction with FIGS. 2 to 7.

Now, let it be assumed that the access node 40 is to be put into operation for the first time and the telephones 20 and 30 are not yet connected at the access node 40. Thus, at the present point in time, the access node 40 knows neither the access data nor the service features which are to be associated with the telephones 20 and 30. Nevertheless, the corresponding association of the subscriber-specific data with regard to the ports 41 and 42 is filed in the database 60.

Now, let it be assumed that the ISDN telephone 20 has been connected to the subscriber line 100 and thus to the port 41 of the access node. As soon as the identification device 46, which is connected to the ports 41 and 42, ascertains that the line 100 has been terminated by the ISDN telephone 20, the identification device 46 signals this to the control device 45. The identification device 46 is embodied in such a way that it can receive and evaluate a signalling message transmitted by the ISDN telephone 20 or the subscriber connection. From the signalling message, the identification device 46 infers the information that the subscriber line 100 has been terminated by the ISDN apparatus 20.

The control device 45 thereupon reads out a corresponding ISDN port-up message from the memory 47, which message contains, in addition to the slot number and the port number of the port 41, also an identification of the access node 40. Under the control of an IP-based signalling protocol, the control device 45 causes the access node 40 to set up an IP-based signalling connection to the VoIP server 50 via the network 90, via which connection the ISDN port-up message is transmitted. Based on the ISDN port-up message received, the VoIP server 50 reads out the subscriber-specific data pertaining to the port 41 and transmits these data as a set ISDN port profile to the access node 40 via the IP-based signalling connection which has been set up, as is illustrated schematically in FIG. 2. The set ISDN port profile is used by the access node 40 to configure the port 41 as an ISDN voice interface. For this purpose, the subscriber call number of the ISDN apparatus 20 and also the corresponding SIP identification are associated with the port 41. Furthermore, all the service features intended for the subscriber connection at which the ISDN telephone 20 is connected are activated. The set ISDN port profile associated with the ISDN telephone 20 is filed in a local memory of the access node 40 or on the printed circuit board on which port 41 is implemented.

Figure 3:
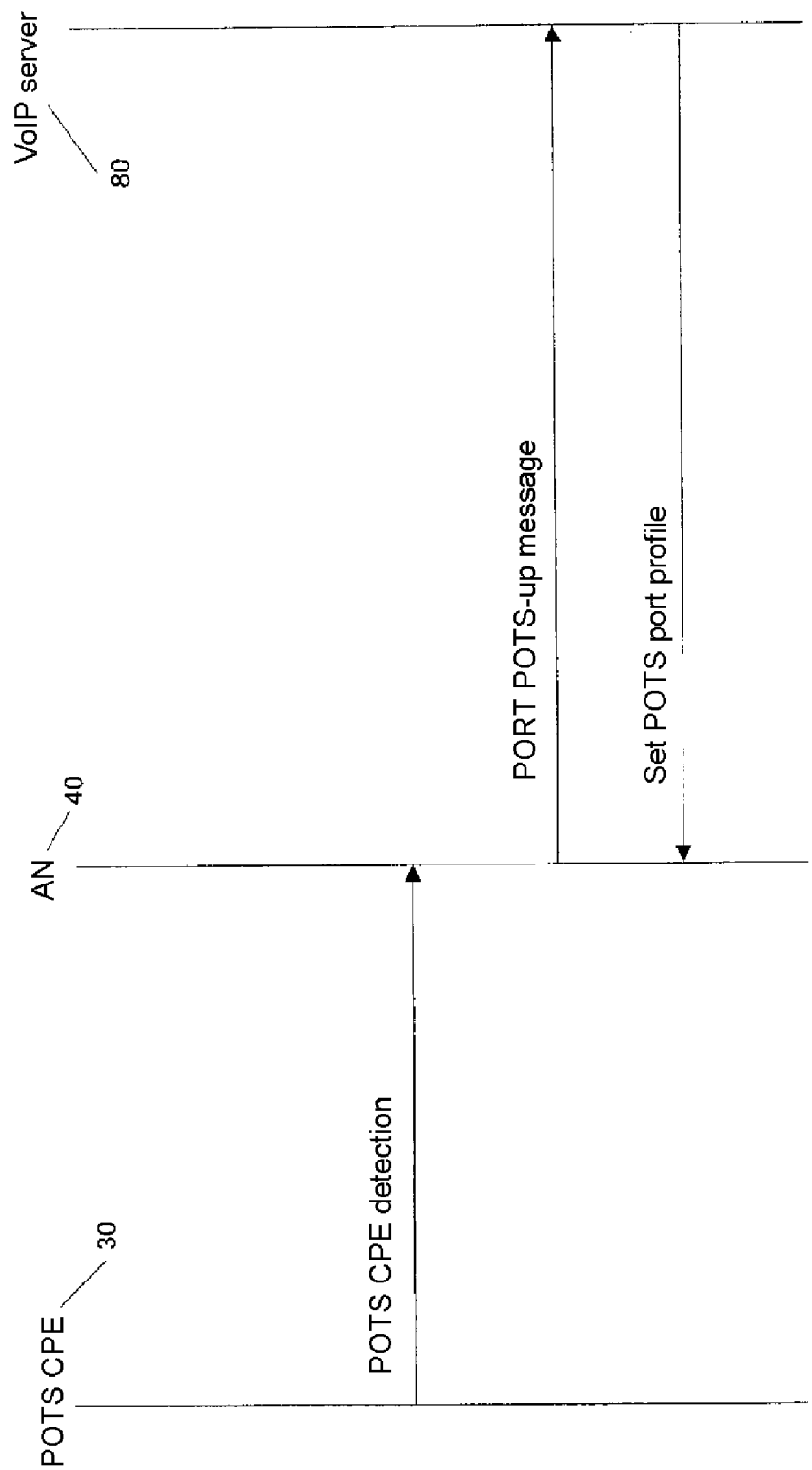
FIG. 3 shows a message flow for activating a conventional analogue voice interface.

Now, let it be assumed that the subscriber line 100 has been terminated by the analogue telephone 30. The identification device 46 identifies this for example by a change in voltage or current at the port 42. This state is reported by the identification device 46 to the control device 45 which thereupon reads out a POTS port-up message from the memory 47 and transmits the message via the set-up IP-based signalling connection of the network 90 to the VoIP server 50. The POTS port-up message contains, in turn, the slot number, the port number of the port 42 and an identification of the access node 40. In response to the POTS port-up message, the VoIP server 50 reads out the subscriber-specific data pertaining to the port 42 and transmits them to the access node 40 as a set POTS port profile, as is illustrated in FIG. 3. The set POTS port profile is filed in a local memory (not shown) of the access node 40 or on a memory of the second printed circuit board. The information contained in the profile is used to configure the port 42 as a POTS voice interface. At the same time, the performance features, which are associated with the subscriber connection at which the analogue telephone 30 is connected, are activated in the access node 40.

Now, VoIP voice connections can be set up to the ISDN telephone 20 and the analogue telephone 30. The control device 45 sets up, using for example the Session Initiation Protocol, a VoIP connection from the access node 40 to the VoIP server 50 via the network 90. Via this VoIP connection, VoIP voice signals can be transmitted from the access node 40 to the VoIP server 50. The VoIP server 50 transmits the VoIP voice signals to the destination via the Internet 80. Similarly, the VoIP voice signals transmitted via the Internet 80, which are intended for the ISDN telephone 20 or the telephone 30, are transmitted from the VoIP server 50 to the access node 40.

The voice signals coming for example from the ISDN telephone 20 are supplied via the port 41, which is configured as an ISDN voice interface, to the conversion device 44 which converts the ISDN voice signals into VoIP voice signals. In the opposite direction, the VoIP voice signals intended for the ISDN telephone are converted in the conversion device 44 into ISDN voice signals. The VoIP voice signals are transmitted, together with the SIP identification associated with the port 41, in IP packets from the VoIP server 50 to the access node 40. Based on the SIP identification, the control device 45 identifies that the VoIP voice signals received are intended for the ISDN telephone 20. The ISDN voice signals generated in the converter 44 are then transmitted to the ISDN apparatus 20 via the port 41 and the subscriber line 100. Similarly, voice signals from the analogue telephone 30 can be transmitted as VoIP signals to the Internet 80 and VoIP signals received via the Internet 80 can be transmitted as analogue voice signals to the analogue telephone 30.

Figure 4:
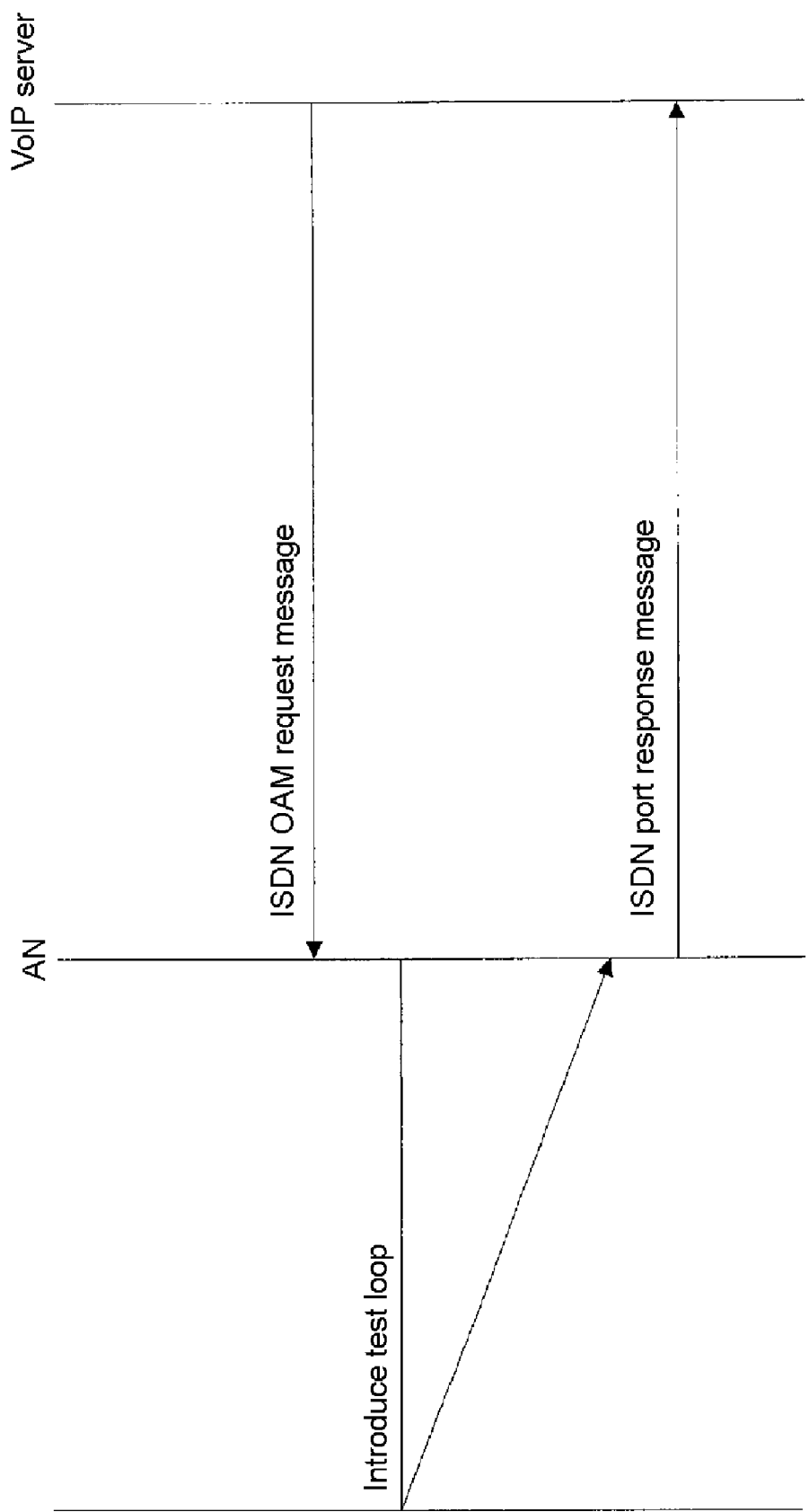
FIG. 4 shows a message flow for activating a subscriber line which is terminated by an ISDN subscriber connection.
Figure 5:
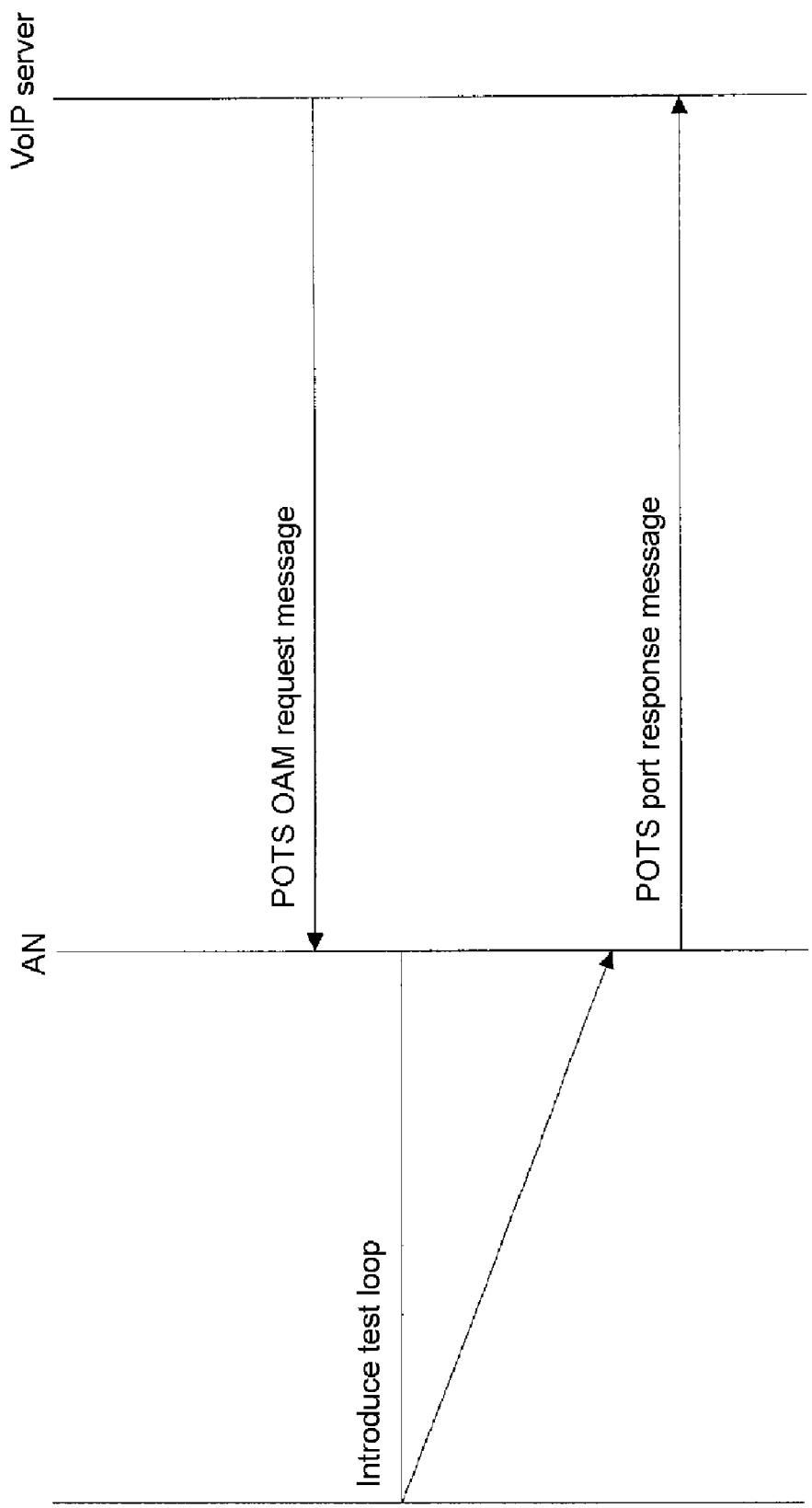
FIG. 5 shows a message flow for activating a loop test with regard to a conventional analogue subscriber connection.

The access node 40 is also able to check in a centrally controlled manner, for example, the state of the line 100. For this purpose, the VoIP server 50 sends what is known as an ISDN-OAM request notice (OAM=operation in maintenance) to the access node 40 via the IP-based signalling connection. In response to the ISDN-OAM request notice received, the control device 45 activates the testing device 49 which carries out a test known per se of the state of the ISDN subscriber line 100. For this purpose, a test word is for example transmitted to the ISDN apparatus 20 via the port 41 and the subscriber line 100. Based on the reply signal received from the ISDN apparatus 20, the testing device 49 identifies the correct or defective state of the line 100. In an ISDN port response notice, the access node 40 then transmits the state of the subscriber line 100 to the VoIP server 50 via the IP-based signalling connection which has been set up. This signalling exchange is illustrated in FIG. 4.

Similarly, the access node 40 can carry out a loop test with regard to the analogue subscriber line 101. For this purpose, the VoIP server 50 generates a corresponding POTS-OAM request notice containing inter alia the SIP identification and the subscriber call number which are associated with the port 42. In response to the POTS-OAM request notice received, the testing device 49 carries out at the port 42 a test of the loop between the port 42 and the analogue terminal 30 connected on the subscriber line 101. For example, the testing device 49 measures the change in current or voltage at the port 42. The testing device 49 transmits the line state determined in a POTS port response notice to the VIP server 50 via the IP-based signalling connection 90 which is set up. The corresponding message flow is illustrated in greater detail in FIG. 5.

It should also be noted that the broadband data arriving at the port 43 are transmitted in the conventional manner from the access node 40 to the IP gateway 70 which then, in turn, supplies the data to the Internet 80.

An applicable signalling protocol can build for example on the ANCP which can be used for exchanging signalling data between an IP gateway and an access multiplexer implemented as a DSLAM. The schematic construction of an ANCP data frame is illustrated in FIG. 6. According to this, the ANCP data frame contains a field for the digital subscriber line type. This may for example be the ADSL, VDSL or the SDSL type. Also provided is a data field in which for example the length of the data frame is contained. FIG. 7 shows a data frame which builds on the ANCP data frame and contains, instead of a field for the DSL type, a field for the port type. The port type can for example specify an ISDN connection, a POTS connection or a DSL connection. Also provided is a field for subscriber access data in which, inter alia, the call number and an SIP identification for a subscriber connection are filed. A further data field is provided, in which the performance features associated with a specific subscriber connection are defined.

Thus, while there have been shown, described, and pointed out fundamental novel features of the invention as applied to several embodiments, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated.

The invention claimed is:

1. A method for configuring an interface of an access node connected to a VoIP server via an IP-based communications network, the method comprising:
   storing subscriber-specific data in a memory device associated with the VoIP server;
   detecting that a subscriber terminal is connected to a port of the access via a subscriber line;
   determining a port-up message based on the type of subscriber terminal connected to the port of the access node;
   transmitting the port-up message to the VoIP server via an IP-based signaling connection between the VoIP server and the access node;
   receiving a port profile from the VoIP server, wherein the port profile is based on the subscriber-specific data and the port-up message; and
   configuring the port of the access node based on the port profile so as to operate the port as a voice interface.

2. The method according to claim 1, wherein the access node has a plurality of ports which, as a function of the subscriber-specific data stored in the memory device, are configured as analog or digital voice interfaces.

3. The method according to claim 1, wherein the stored subscriber-specific data contains subscriber-relevant access data, including at least a subscriber call number and an SIP identifier, and also at least one service feature of at least one analog or digital subscriber connection.

4. The method according to claim 1, wherein voice signals coming from an analog or digital subscriber terminal are converted in the access node into VoIP signals for transmission to the VoIP server, and the VoIP signals coming from the VoIP server are converted in the access node into voice signals for transmission to the analog or digital subscriber terminal.

5. The method according to claim 1, wherein the port-up message includes a port number and a slot number of the interface.

6. The method according to claim 1, further comprising:
   setting up a VoIP connection between the access node and the VoIP server under the control of the access node, and exchanging connection voice signals between the subscriber terminal connected at the port and the VoIP server.

7. The method according to claim 1, further comprising:
   transmitting a control command using the IP-based signaling protocol from the VoIP server to the access node so as to activate a test of the subscriber line which is terminated by the access node and the subscriber terminal;
   testing the subscriber line terminated by the access node and the subscriber terminal; and
   transmitting an item of information which indicates the state of the subscriber line, using the IP-based signaling protocol, from the access node to the VoIP server.

8. The method according to claim 1, wherein the IP-based signaling protocol used is a modified Access Node Control Protocol (ANCP).

9. A broadband access system controlling an interface of an access node, the broadband access system comprising:
   a remote-controllable access node connected to a VoIP server via an IP-based communications network;
   an analog or digital subscriber terminal connected to the access node via a subscriber line; and
   a system memory device associated with the VoIP server configured to store subscriber-specific data;
   wherein the access node includes:
      a port to which the analog or digital subscriber terminal is connected via the subscriber line;
      an access node memory device configured to store a port-up message, wherein the port-up message is transmitted to the VoIP server by the access node via an IP-based signaling connection between the VoIP server and the access node;
      an identification device for detecting that the analog or digital subscriber terminal is connected to the port and determining the type of subscriber terminal connected to the port; and
      a remote control device operable to configure the port based on a port profile received from the VoIP server, wherein the port profile is based on the subscriber-specific data and the port-up message.

10. The broadband access system according to claim 9, wherein the access node is configured so that the port is able to transmit and receive voice signals to and from a digital or analog subscriber connection.

11. The broadband access system according to claim 9 wherein the access node includes a conversion device configured to convert voice signals from the analog or digital subscriber terminal into VoIP signals, and further configured to convert VoIP signals into voice signals for transmission to the analog or digital subscriber terminal.

12. The broadband access system according to claim 9 wherein the access node includes a testing device which, in response to a control command from the VoIP server, is configured to test the subscriber line which is terminated by the access node and the analog or digital subscriber terminal.

13. The broadband access system according to claim 9, wherein the access node includes at least one broadband data interface connected to an IP gateway, via an IP-based connection.

14. The broadband access system according to claim 9, wherein the access node includes a control device configured to establish an IP-based voice communication connection to the VoIP server.

15. An access node for use in a broadband access system, the access node comprising:
- a port to which the analog or digital subscriber terminal is connected via the subscriber line;
- a memory device configured to store a port-up message, wherein the port-up message is transmitted to a VoIP server by the access node via an IP-based signaling connection between the VoIP server and the access node;
- an identification device configured to detect that an analog or digital subscriber terminal is connected to the port and determine the type of subscriber terminal connected to the port; and
- a remote control device operable to configure the port based on a port profile received from the VoIP server, wherein the port profile is based on subscriber-specific data and the port-up message.

16. The access node according to claim 15, further comprising a conversion device configured to convert voice signals, coming from the analog or digital subscriber terminal, into VoIP signals, and further configured to convert VoIP signals into voice signals for transmission to the analog or digital subscriber terminal.

17. The access node according to claim 15, further comprising a remote-controllable testing device configured, in response to a control command from a VoIP server, to perform a test of a subscriber line which is terminated by the access node and the analog or digital subscriber terminal.

* * * * *